US 10,922,857 B2

(12) United States Patent
Lee et al.

(10) Patent No.: US 10,922,857 B2
(45) Date of Patent: Feb. 16, 2021

(54) ELECTRONIC DEVICE AND OPERATION METHOD FOR PERFORMING A DRAWING FUNCTION

(71) Applicant: Samsung Electronics Co., Ltd., Suwon-si (KR)

(72) Inventors: Hwa-Jun Lee, Seongnam-si (KR); Chae-Kyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/955,224

(22) Filed: Apr. 17, 2018

(65) Prior Publication Data
US 2018/0300910 A1 Oct. 18, 2018

(30) Foreign Application Priority Data

Apr. 17, 2017 (KR) .................. 10-2017-0049387

(51) Int. Cl.
G06T 11/20 (2006.01)
G06T 11/00 (2006.01)
G06F 16/532 (2019.01)
G06F 16/583 (2019.01)
G06T 11/60 (2006.01)

(52) U.S. Cl.
CPC ............ *G06T 11/20* (2013.01); *G06F 16/532* (2019.01); *G06F 16/5838* (2019.01); *G06T 11/001* (2013.01); *G06T 11/60* (2013.01); *G06T 2200/24* (2013.01)

(58) Field of Classification Search
CPC ......... G06T 11/20; G06T 11/001; G06T 1/20; G06T 11/60; G06T 2200/24; G06T 2207/10024; G06T 7/90; G06F 16/5838; G06F 16/532; G06F 16/5854
See application file for complete search history.

(56) References Cited

U.S. PATENT DOCUMENTS

| 7,356,190 B2 * | 4/2008 | Mizoguchi ......... G06K 9/00234 358/518 |
| 9,965,895 B1 * | 5/2018 | Gray ..................... G06T 19/006 |
| 2008/0158428 A1 * | 7/2008 | Ishii ......................... H04N 9/77 348/663 |
| 2012/0054177 A1 * | 3/2012 | Wang ................... G06K 9/4609 707/723 |
| 2014/0169683 A1 * | 6/2014 | Wang ................... G06K 9/4604 382/199 |
| 2014/0279265 A1 | 9/2014 | Bhardwaj et al. |
| 2015/0228201 A1 * | 8/2015 | Nemeckay ............... G09B 5/00 434/85 |

(Continued)

FOREIGN PATENT DOCUMENTS

| JP | 2013102300 A | * | 5/2013 | .............. G06T 1/00 |
| WO | WO 2014160426 A1 | * | 10/2014 | .............. G06K 9/46 |

*Primary Examiner* — Maurice L. McDowell, Jr.
*Assistant Examiner* — Donna J. Ricks
(74) *Attorney, Agent, or Firm* — Jefferson IP Law, LLP

(57) ABSTRACT

An electronic device and a method of controlling the electronic device are provided. The electronic device includes a display and at least one processor. The at least one processor receives input information for generating at least part of a first object, recognizes the first object based on the received input information, and controls a display to display a color obtained from the first object and an image associated with the first object.

14 Claims, 12 Drawing Sheets

(56) References Cited

U.S. PATENT DOCUMENTS

| | | | |
|---|---|---|---|
| 2016/0062638 A1* | 3/2016 | Yakishyn | G06F 3/04883 |
| | | | 715/863 |
| 2016/0132498 A1* | 5/2016 | Wang | G06K 9/6215 |
| | | | 382/165 |
| 2016/0203194 A1* | 7/2016 | Park | G06F 3/0482 |
| | | | 707/722 |
| 2016/0217598 A1* | 7/2016 | Grasso | G06T 11/203 |
| 2016/0259766 A1 | 9/2016 | Ivanov et al. | |
| 2016/0364091 A1* | 12/2016 | Bernstein | G06F 3/03545 |

* cited by examiner

ELECTRONIC DEVICE AND OPERATION METHOD FOR PERFORMING A DRAWING FUNCTION

CROSS-REFERENCE TO RELATED APPLICATION(S)

This application is based on and claims priority under 35 U.S.C. § 119 to Korean Patent Application No. 10-2017-0049387, filed on Apr. 17, 2017, in the Korean Intellectual Property Office, the disclosure of which is incorporated by reference herein in its entirety.

TECHNICAL FIELD

The disclosure relates to an electronic device that provides a drawing function, and a method for controlling the same.

BACKGROUND

With the development of electronic technology, various types of electronic products are being developed and provided. In particular, portable electronic devices having various functions, such as a smartphone and a tablet personal computer (PC), have been increasingly provided in recent years.

Recently, there have been increasingly supplied a range of services that furnish various tools for users to draw an object through applications provided by portable electronic devices, thereby providing convenience for users.

The above information is presented as background information only to assist with an understanding of the disclosure. No determination has been made, and no assertion is made, as to whether any of the above might be applicable as prior art with regard to the disclosure.

SUMMARY

When a user draws an object using an input tool, which is a virtual input tool, it may difficult to display an image for reference in sketching or coloring and an area for the user to draw the object at the same time. Thus, the user needs to sketch the object from memory, making it difficult to sketch the object in detail, and also needs to choose a color from a palette and to color the object relying on memory.

Aspects of the disclosure are to address at least the above-mentioned problems and/or disadvantages and to provide at least the advantages described below. Accordingly, when an object is recognized, it is possible, in an aspect of the disclosure, to provide an electronic device for simply completing drawing an object by providing an image of the recognized object by obtaining colors frequently included in the image and by displaying color information on a display.

In accordance with an aspect of the disclosure, an electronic device is provided. The electronic device includes a display and at least one processor, wherein the at least one processor may receive input information for generating at least part of a first object, recognize the first object based on the received input information, and control a display to display an image associated with the first object and a color obtained from the image.

In accordance with another aspect of the disclosure, a method for controlling an electronic device is provided. The method includes receiving input information for generating at least part of a first object, recognizing the first object based on the received input information, and controlling a display to display an image associated with the first object and a color obtained from the image.

In accordance with another aspect of the disclosure, a non-transitory computer-readable recording medium having an executable program stored thereon that, when executed, causes at least one processor to perform the following operations: receiving input information for generating at least part of a first object, recognizing the first object based on the received input information, and controlling a display to display an image associated with the first object and a color obtained from the image.

According to various embodiments, a user may be provided with an image of an object from an electronic device that has recognized the object, thereby easily drawing the object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
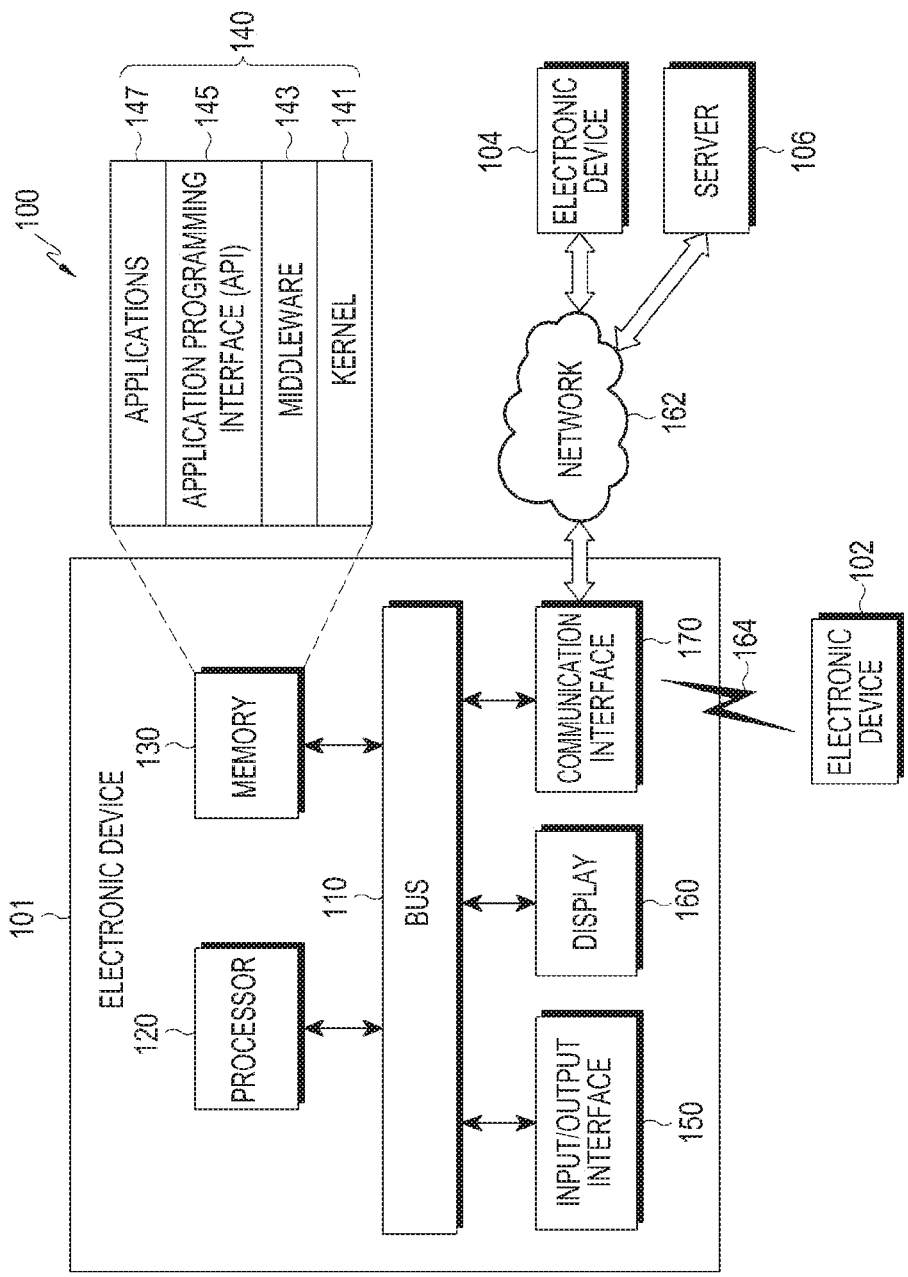
FIG. 1 illustrates a network environment including an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "configured to" as used in various embodiments may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStationT™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment is not limited to the above described devices. In the present disclosure, the term "user" may indicate a person using an electronic device or a device (e.g., an artificial intelligence electronic device) using an electronic device.

FIG. 1 illustrates an electronic device 101 in a network environment 100 according to an embodiment of the disclosure.

Referring to FIG. 1, the electronic device 101 may include a bus 110, a processor 120, a memory 130, an input/output interface 150, a display 160, and a communication interface 170. In some embodiments, at least one of the components may be omitted, or additional components may be further included in the electronic device 101. The bus 110 may include a circuit that connects the components 110 to 170 to each other and delivers communications (for example, control messages or data) between the components. The processor 120 may include one or more of a central processing unit (CPU), an application processor (AP), and a communication processor (CP). The processor 120 may control, for example, at least one different component of the electronic device 101, and/or may perform operations relating to communication or data processing.

The memory 130 may include a volatile and/or nonvolatile memory. The memory 130 may store, for example, a command or data related to at least one different component of the electronic device 101. According to one embodiment, the memory 130 may store software and/or a program 140. The program 140 may include, for example, a kernel 141, middleware 143, an application programming interface (API) 145, and/or an application (or "app") 147. At least part of the kernel 141, the middleware 143, and the API 145 may be designated as an operating system (OS). The kernel 141 may control or manage system resources (for example, the bus 110, the processor 120, the memory 130, or the like) used to perform an operation or function implemented in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data. Further, the middleware 143 may process one or more requests for operations received from the application 147 according to the priority thereof. For example, the middleware 143 may assign at least one application 147 a priority for using a system resource of the electronic device 101 (for example, the bus 110, the processor 120, the memory 130, or the like) and may process the one or more requests for operations. The API 145 is an interface for the application 147 to control a function provided from the kernel 141 or the middleware 143, and may include, for example, at least one interface or function (for example, a command) for file control, window control, image processing, or text control. The input/output interface 150 may deliver a command or data, which is input from, for example, a user or a different external device, to a different component(s) of the electronic device 101, or may output a command or data, which is received from a different component(s) of the electronic device 101, to the user or to the different external device.

The display 160 may include, for example, a liquid crystal display (LCD), a light-emitting diode (LED) display, an organic LED (OLED) display, a plastic OLED (POLED), a micro-electro-mechanical systems (MEMS) display, or an electronic paper display. The display 160 may display, for example, various types of content (for example, text, an image, a video, an icon, and/or a symbol) for the user. The display 160 may include a touch screen and may receive touch, gesture, proximity, or hovering input using, for example, an electronic input tool or a body part of a user. The communication interface 170 may establish communication, for example, between the electronic device 101 and an external device (for example, a first external electronic device 102, a second external electronic device 104, or a server 106). For example, the communication interface 170 may be connected to a network 162 via wireless communication or wired communication to communicate with the external device (for example, the second external electronic device 104 or the server 106).

The wireless communication may include cellular communication using, for example, at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). According to one embodiment, the communication interface 170 may communicate with the electronic device 102 via wireless communication 164, as illustrated in FIG. 1. For example, the wireless communication 164 may be at least one of wireless fidelity (Wi-Fi), light fidelity (Li-Fi), Bluetooth, bluetooth low energy (BLE), ZigBee, near-field communication (NFC), magnetic secure transmission (MST), radio frequency (RF), and/or a body area network (BAN). According to one embodiment, the wireless communication may include a global navigation satellite system (GNSS). The GNSS may be, for example, a GPS, a GNSS, a BeiDou Navigation Satellite System (hereinafter, "BeiDou"), or Galileo, which is the European global satellite-based navigation system. In the present document, "GPS" may be interchangeably used with "GNSS" hereinafter. The wired communication may include, for example, at least one of universal serial bus (USB), high-definition multimedia interface (HDMI), recommended standard 232 (RS-232), power line communication (PLC), and plain old telephone service (POTS). The network 162 may include a telecommunications network, which may be, for example, at least one of a computer network (for example, a local area network (LAN) or wide area network (WAN)), the Internet, and a telephone network.

Each of the first and second external electronic devices 102 and 104 may be a device of a type that is the same as, or different from, that of the electronic device 101. According to various embodiments, all or some of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the same received result or after additionally processing the result. To this end, cloud-computing, distributed-computing, or client-server-computing technologies may be used.

Figure 2:
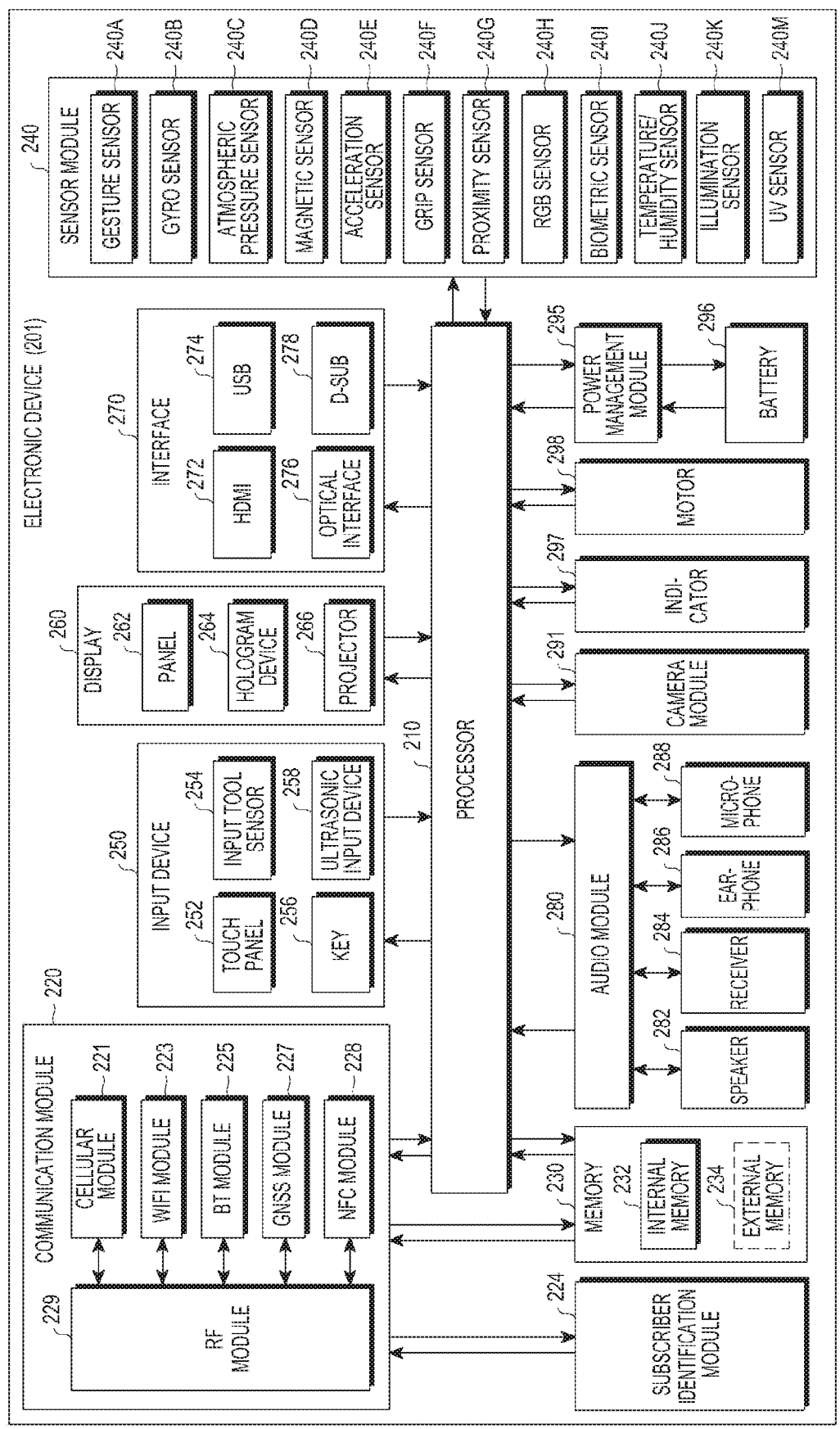
FIG. 2 is a block diagram of an electronic device according to an embodiment of the disclosure.

FIG. 2 is a block diagram of an electronic device 201 according to an embodiment of the disclosure.

The electronic device 201 may include, for example, all or part of the electronic device 101 illustrated in FIG. 1. The electronic device 201 may include one or more processors (for example, APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processors 210 may run, for example, an operating system (OS) or an application to control a plurality of hardware or software components that are connected to the processors 210, and may perform various kinds of data processing and operations. The processors 210 may be configured, for example, as a system on chip (SoC). According to one embodiment, the processors 210 may further include a graphic processing unit (GPU) and/or an image signal processor (ISP). The processors 210 may include at least some (for example, a cellular module 221) of the components illustrated in FIG. 2. The processors 210 may load a command or data received from at least one of other components (for example, a nonvolatile memory) into a volatile memory to process the command or data, and may store resultant data in the nonvolatile memory.

The communication module 220 may have a configuration that is the same as, or similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text messaging service, or an Internet service through a communication network. According to one embodiment, the cellular module 221 may perform identification and authentication of the electronic device 201 in a communication network using a subscriber identity module (SIM, for example, a SIM card) 224. According to one embodiment, the cellular module 221 may perform at least some of the functions provided by the processors 210. According to one embodiment, the cellular module 221 may include a CP. According to one embodiment, at least some (for example, two or more) of the cellular module 221, the Wi-Fi module 223, the Bluetooth module 225, the GNSS module 227, and the NFC module 228 may be included in one integrated chip (IC) or IC package. The RF module 229 may transmit and receive, for example, a communication signal (for example, an RF signal). The RF module 229 may include, for example, a transceiver, a power amplifier (amp) module (PAM), a frequency filter, a low-noise amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module. The SIM 224 may include, for example, a card including a SIM or an embedded SIM, and may include unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid-state drive (SSD)). The external memory 234 may include a flash drive, for example, a compact flash (CF), a secure digital (SD), a micro-SD, a mini-SD, an extreme digital (xD), a multi-media card (MMC), a memory stick, or the like. The external memory 234 may be functionally or physically connected to the electronic device 201 through any of various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) input tool sensor 254, a key 256, or an ultrasonic input device 258. The touch panel 252 may be, for example, at least one of an electrostatic type, a pressure-sensitive type, an IR type, and an ultrasonic type. Further, the touch panel 252 may further include a control circuit. The touch panel 252 may further include a tactile layer to provide a user with a tactile response. The (digital) input tool sensor 254 may, for example, be part of the touch panel or may include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, the display 160) may include a panel 262, a hologram device 264, a projector 266, and/or a control circuit to control these components. The panel 262 may be configured, for example, to be flexible, transparent, or wearable. The panel 262 may be formed with the touch panel 252 in one or more modules. According to one embodiment, the panel 262 may include a pressure sensor (or force sensor) to measure the strength of pressure of a user's touch. The pressure sensor may be formed with the touch panel 252 in a single body, or may be provided as one or more sensors separate from the touch panel 252. The hologram device 264 may display a three-dimensional image in the air using light interference. The projector 266 may project light onto a screen to display an image. The screen may be disposed, for example, inside or outside the electronic device 201. The interface 270 may include, for example, an HDMI 272, a USB 274, an optical interface 276, or a D-subminiature (D-sub) interface 278. The interface 270 may be included, for example, in the communication interface 170 illustrated in FIG. 1. Additionally or alternatively, the interface 270 may include, for example, a mobile high-definition link (MHL) interface, an SD card/MMC interface, or an infrared data association (IrDA) interface.

The audio module 280 may bidirectionally convert, for example, a sound and an electrical signal. At least some components of the audio module 280 may be included, for example, in the input/output interface 150 illustrated in FIG. 1. The audio module 280 may process sound information input or output, for example, through a speaker 282, a receiver 284, earphones 286, or the microphone 288. The camera module 291 is a device that takes, for example, a still image and a video. According to one embodiment, the camera module 291 may include one or more image sensors (for example, a front sensor or a rear sensor), a lens, an image signal processor (ISP), or a flash (for example, an LED, a xenon lamp, or the like). The power management module 295 may manage, for example, the power of the electronic device 201. According to one embodiment, the power management module 295 may include a power management integrated circuit (PMIC), a charger IC, or a battery or fuel gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. The electronic device 201 may include a mobile TV supporting device (for example, a GPU) that is capable of processing media data in accordance with, for example, digital multimedia broadcasting (DMB), digital video broadcasting (DVB), or mediaFlo™ standards. Each element mentioned in the present document may include one or more components, and may be designated by different terms depending on the type of the electronic device. In various embodiments, an electronic device (for example, the electronic device 201) may be configured such that some elements are omitted, additional elements are further included, or some of the elements are combined into one entity, which may perform the same functions as those of the corresponding elements before combination.

Figure 3:
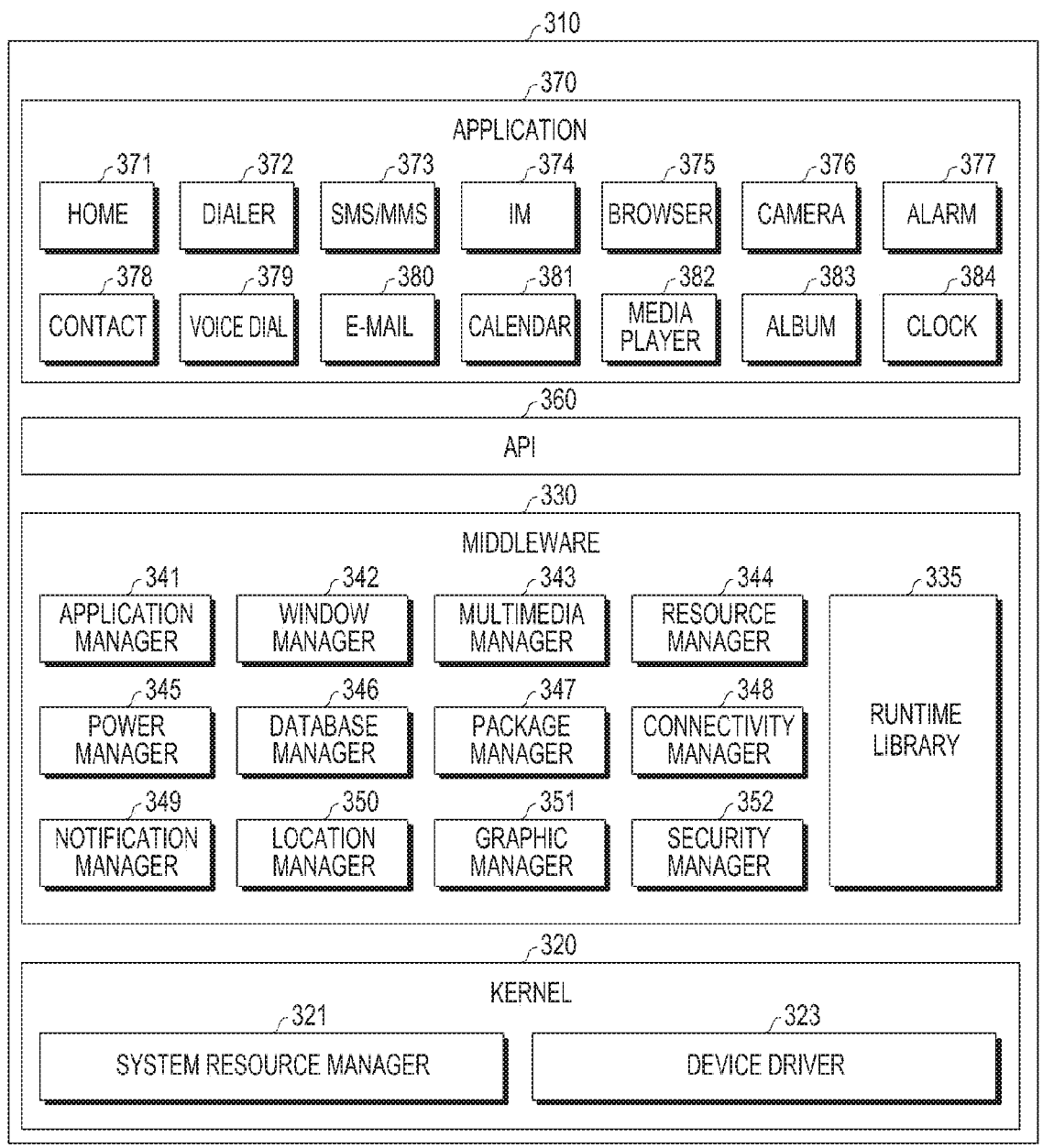
FIG. 3 is a block diagram of a program module according to an embodiment of the disclosure.

FIG. 3 is a block diagram of a program module according to an embodiment of the disclosure.

According to one embodiment, the program module 310 (for example, the program 140) may include an operating system (OS) that controls resources related to an electronic device (for example, the electronic device 101) and/or various applications (for example, the application 147) that run on the OS. The OS may include, for example, Android™, iOS™, Windows™, Symbian™, Tizen™, Bada™, or the like. Referring to FIG. 3, the program module 310 may include a kernel 320 (for example, the kernel 141), middleware 330 (for example, the middleware 143), an API 360 (for example, the API 145), and/or an application 370 (for example, the application 147). At least part of the program module 310 may be preloaded onto the electronic device or may be downloaded from an external electronic device (for example, the electronic device 102 or 104, the server 106, or the like).

The kernel 320 may include, for example, a system resource manager 321 and/or a device driver 323. The system resource manager 321 may perform control, allocation, or recovery of system resources. According to one embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, functions commonly needed for applications 370, or may provide an application 370 with various functions through the API 360 so that the application 370 may use the limited systems resources in the electronic device. According to one embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 335 may perform input/output management, memory management, or arithmetic function processing. The application manager 341 may manage, for example, the life cycle of the application 370. The window manager 342 may manage graphic user interface (GUI) resources used for a screen. The multimedia manager 343 may identify formats that are necessary to play media files, and may encrypt or decrypt a media file using a codec suitable for a corresponding format. The resource manager 344 may manage a source code or memory space for the application 370. The power manager 345 may manage battery capacity, temperature, or power supply, and may determine or provide information on power necessary for the operation of the electronic device using corresponding information among these. According to one embodiment, the power manager 345 may interwork with a basic input/output system (BIOS). The database manager 346 may generate, retrieve, or change a database to be used for, for example, the application 370. The package manager 347 may install or update an application distributed in the form of a package file.

The connectivity manager 348 may manage, for example, wireless connectivity. The notification manager 349 may provide a user with an event, for example, an incoming message, an appointment, and a proximity notification. The location manager 350 may manage, for example, information about the location of the electronic device. The graphic manager 351 may manage, for example, a graphic effect to be provided for the user or a user interface related to the graphic effect. The security manager 352 may provide, for example, system security or user authentication. According to one embodiment, the middleware 330 may include a telephony manager to manage a voice or video call function of the electronic device or a middleware module that is capable of forming combinations of functions of the foregoing elements. According to one embodiment, the middleware 330 may provide a specialized module for each operating system (OS). The middleware 330 may dynamically delete some of the existing elements or add new elements. The API 360 is, for example, a set of API programming functions, and may be provided with a different configuration depending on the OS. For example, one API set for each platform may be provided in Android or iOS, while two or more API sets for each platform may be provided in Tizen.

The application 370 may include, for example, a home screen 371, a dialer 372, an short message service (SMS)/multimedia message service (MMS) 373, an instant message (IM) 374, a browser 375, a camera 376, an alarm 377, an address book 378, a voice dialer 379, an email 380, a calendar 381, a media player 382, an album 383, a clock 384, a healthcare application (for example, for measuring exercising or blood sugar), or an environmental data application (for example, for providing atmospheric pressure, humidity, or temperature data). According to one embodiment, the application 370 may include an information exchange application that is capable of supporting information exchange between the electronic device and an external electronic device. The information exchange application may include, for example, a notification relay application for relaying specific information to the external electronic device or a device management application for managing the external electronic device. For example, the notification relay application may relay notification information, which is generated in another application of the electronic device, to the external electronic device, or may receive notification information from the external electronic device and provide the notification information to the user. The device management application may install, delete, or update, for example, a function (for example, a function of turning on/turning off the external electronic device itself (or some components) or adjusting the brightness (or resolution) of a display) of an external electronic device communicating with the electronic device or an application operating in the external electronic device. According to one embodiment, the application 370 may include an application (for example, a healthcare application of a mobile medical device) assigned according to the attributes of the external electronic device. According to one embodiment, the application 370 may include an application received from the external electronic device. At least part of the program module 310 may be implemented (for example, run) by software, firmware, hardware (for example, the processors 210), or combinations of at least two or more thereof, and may include a module, a program, a routine, sets of instructions, or a process to perform one or more functions.

Figure 4:
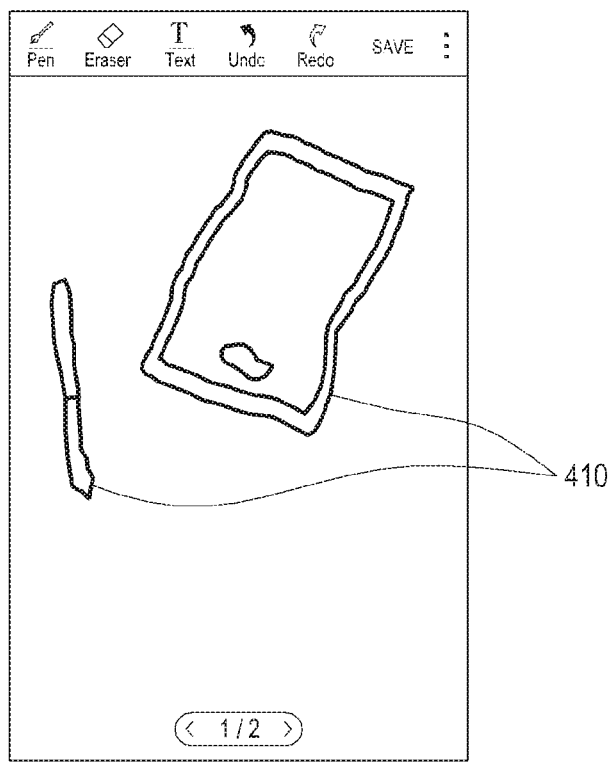
FIG. 4 illustrates a configuration for an electronic device to recognize an object according to an embodiment of the disclosure.

FIG. 4 illustrates a configuration for an electronic device to recognize an object according to an embodiment of the disclosure.

According to various embodiments, a processor (for example, the processor 120 of FIG. 1) may recognize an object 410 generated by a user input. A user may generate at least part of an object using various input devices. For example, the user may perform an operation of drawing an object generated through not only an input device including a mouse but also a touch input through a touch screen or various input device including a stylus input tool, and the processor (for example, the processor 120 of FIG. 1) may estimate the entire object using at least part of the object being drawn, thereby recognizing the object. According to one embodiment, the processor (for example, the processor 120 of FIG. 1) may store information on at least one object and on at least one image associated with the at least one object in a memory. When an object generated by the user is recognizable, for example, when at least part of an object is drawn at a threshold level or higher to be recognizable by the processor (for example, the processor 120 of FIG. 1), the processor (for example, the processor 120 of FIG. 1) may compare an image associated with the recognized object with a plurality of images associated with a plurality of objects stored in the memory and may select at least one image associated with at least one object from among the images associated with the plurality of objects. The processor (for example, the processor 120 of FIG. 1) may select an image of an object that is identical or the most similar to that of the object generated by the user based on the level of similarity and may display the selected image on a display for the user. Displaying a similar object on a display will be described in detail with reference to FIG. 6.

Figure 5A:
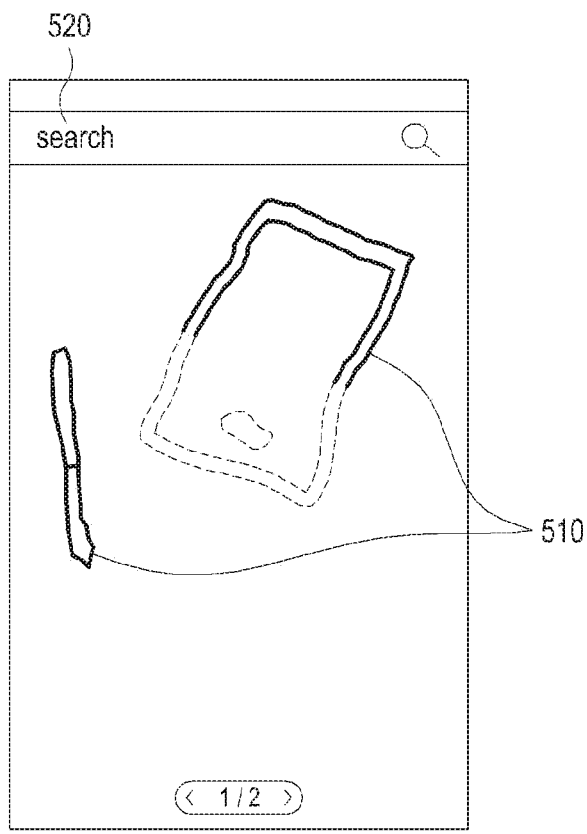
FIGS. 5A and 5B illustrate a configuration for an electronic device to provide an object search function according to various embodiments of the disclosure.
Figure 5B:
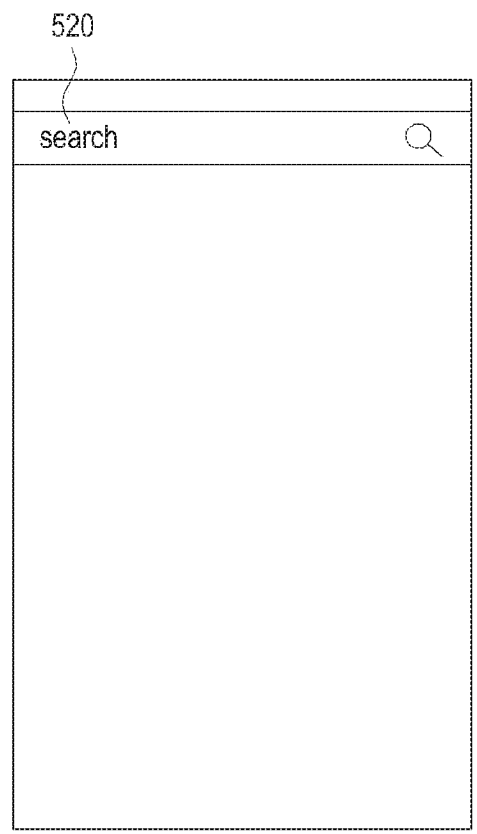

FIGS. 5A and 5B illustrate a configuration for an electronic device to provide an object search function according to various embodiments of the disclosure.

According to various embodiments, a user may retrieve an object to generate and may select at least one image from among a plurality of images associated with a plurality of retrieved objects. Referring to FIG. 5A, a processor (for example, the processor 120 of FIG. 1) may receive an input of drawing at least part of an object 510 and may generate the at least part of the object according to the received input. The processor (for example, the processor 120 of FIG. 1) may receive input information, for example, touch input information, associated with the at least part of the object 510 through a touch screen. Here, the input information may include at least one of coordinate information on a spot designated by a user input on a screen displayed on the touch screen and time information on the input. According to one embodiment, the processor may recognize the generated object based on the coordinate information on the input displayed on the touch screen and the time information.

According to one embodiment, the processor (for example, the processor 120 of FIG. 1) may receive additional search information on the object from the user through a search box 520, retrieve the object from a memory included in the electronic device or an external server based on the received search information, and provide the user with a search result. The search result may include a plurality of images associated with a plurality of objects retrieved based on the search information, and the user may select an image associated with at least one object from among the search results. A configuration in which a search result is provided and a user selects a retrieved object will be described with reference to FIG. 6.

According to various embodiments, the processor (for example, the processor 120 of FIG. 1) may select an image associated with the object using only the search result in a state where the user has not generated the object. Referring to FIG. 5B, the processor (for example, the processor 120 of FIG. 1) may receive a search word input through the search box 520 instead of receiving an input about the object from the user and may display a result of retrieving an image associated with the object on the display in the same manner as mentioned above. The processor (for example, the processor 120 of FIG. 1) may display an image associated with the object retrieved based on data received from a web server, such as a cloud, or data stored in the memory of the electronic device.

Figure 6:
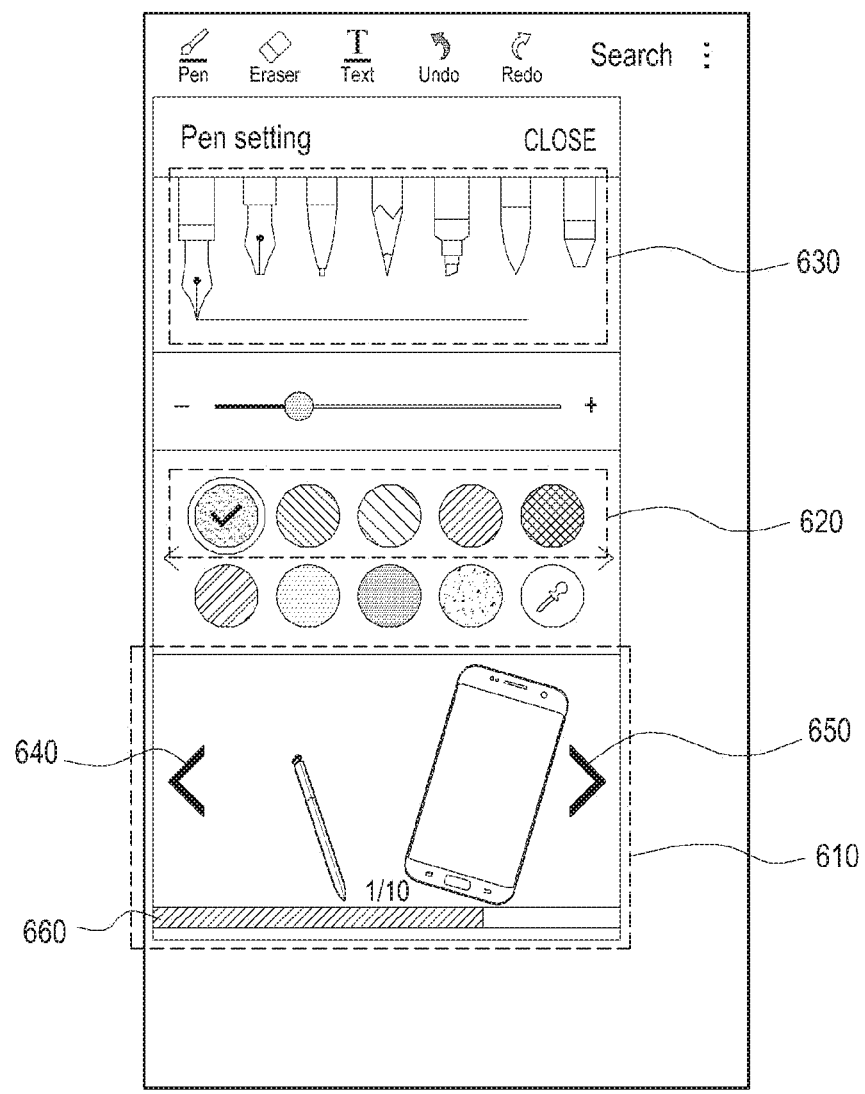
FIG. 6 illustrates that an electronic device provides a tool for drawing an object according to an embodiment of the disclosure.

FIG. 6 illustrates that an electronic device provides a tool for generating an object according to an embodiment of the disclosure.

According to various embodiments, when a processor (for example, the processor 120 of FIG. 1) recognizes an object generated by a user, an object is retrieved by a search by the user, or an object generated by the user is recognized based on information about at least part of the object and search information, the processor may provide a tool enabling the user to additionally input the object. The tool may include a first area 610 of a display for providing a retrieved or recognized object, a second area 620 of the display for selecting a color of an input tool to sketch an object with, and a third area 630 of the display for selecting an input tool. The first area 610, the second area 620, and the third area 630 of the display shown in FIG. 6 are for illustration only and are not fixed in the entire area of the display. The first area 610, the second area 620, and the third area 630 may be displayed on the display in various ways and are not intended to limit the scope of the present disclosure. The user may use an input device to select an input tool for drawing an object from the third area 630 of the display or to select a color of the selected input tool from the second area 620 of the display. According to one embodiment, the processor (for example, the processor 120 of FIG. 1) may obtain a color included in the object from the object displayed in a first area 610, and display the obtained color in the second area 620 of the display. A configuration in which the processor (for example, the processor 120 of FIG. 1) obtains a color from an image associated with an object will be described in detail with reference to FIGS. 7A and 7B. According to one embodiment, the processor (for example, the processor 120 of FIG. 1) may control the object tab 640 or 650 to display, in the first area 610, an image associated with a retrieved object or at least one recognized object. Images associated with the at least one object may be arranged in order of similarity level from an image of the highest similarity level associated with the object, and the processor (for example, the processor 120 of FIG. 1) may receive an input on a left tab 640 or a right tab 650 and may perform to display a left object or a right object among a plurality of objects arranged based on an object displayed based on the received input. According to one embodiment, the processor (for example, the processor 120 of FIG. 1) may display the level of similarity between the recognized object and the image displayed in the first area 610 in the form of a bar 660. For example, the processor may display the length of the bar 660 depending on the level of similarity for the object that is displayed in the first area. In addition, the processor may display in sequence, as controllable by the tabs 640 and 650, the number of sequenced objects (e.g., 1/10 being the first object among ten objects, as shown in FIG. 6). Although not shown in the FIG. 6, the processor may display the level of similarity expressed in percentage for the object displayed in the first area 610. The user may check the level of similarity to identify whether the object is recognized, and may select the identified object.

Figure 7A:
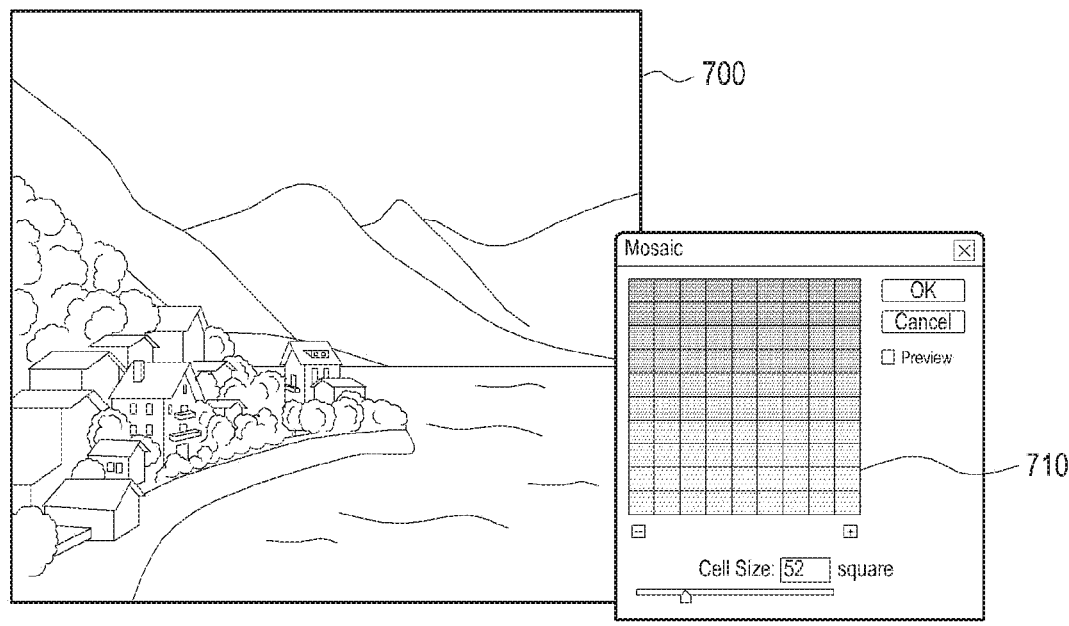
FIGS. 7A and 7B illustrate a configuration for obtaining a color from an object according to various embodiments of the disclosure.
Figure 7B:
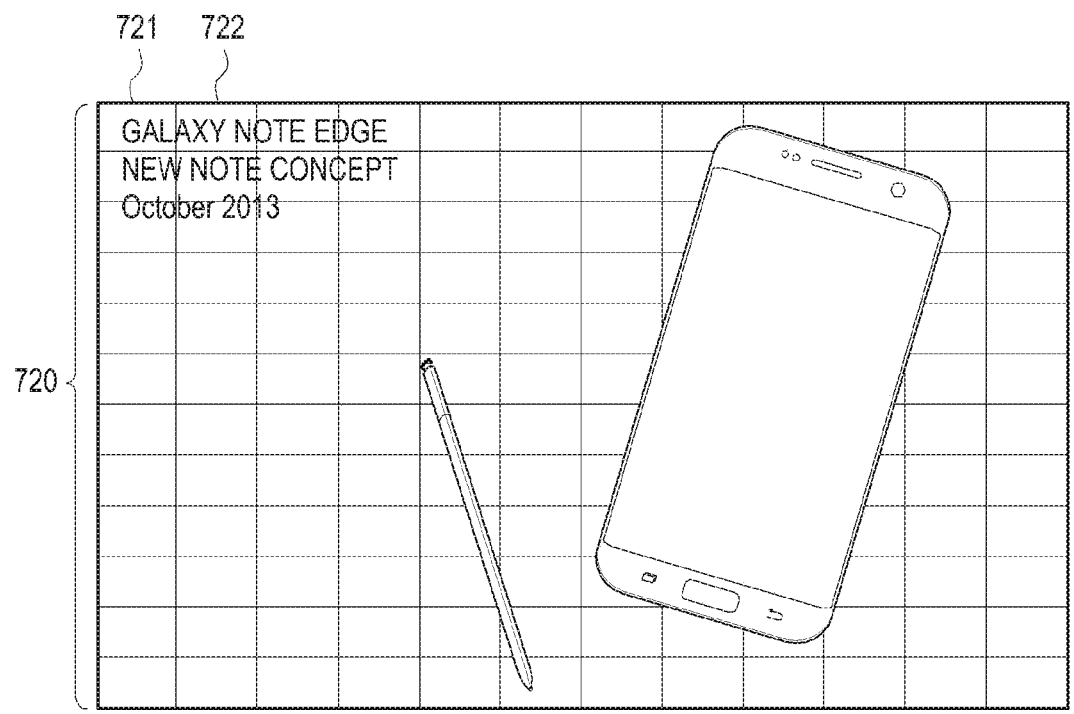

FIGS. 7A and 7B illustrate a configuration for obtaining a color from an object according to various embodiments of the disclosure.

According to various embodiments, a processor (for example, the processor 120 of FIG. 1) of an electronic device may obtain a plurality of pieces of color information from an image associated with an object. Referring to FIG. 7A, the processor (for example, the processor 120 of FIG. 1) may divide the image associated with the object into a plurality of cells and may obtain the average 710 of color values in each cell. The processor may check the frequencies of averages of color values in the image associated with the object and may obtain and store a color value with a high frequency. According to one embodiment, the processor (for example, the processor 120 of FIG. 1) may display the stored color value in the second area 620 of the display of FIG. 6. Referring to FIG. 7B, the processor (for example, the processor 120 of FIG. 1) may divide an image 720 associated with an object with a plurality of cells 721, 722, and the like, instead of obtaining an average of color values in each cell as in FIG. 7A. According to one embodiment, the processor (for example, the processor 120 of FIG. 1) may obtain the color value of a divided cell. The processor (for example, the processor 120 of FIG. 1) may obtain the color of each divided cell using various methods, for example, a method of obtaining a color most frequently included in the area of a divided cell. The processor (for example, the processor 120 of FIG. 1) may check the frequencies of colors in each divided cell, and store information on a color with a high frequency in a memory. According to one embodiment, the processor (for example, the processor 120 of FIG. 1) may display the stored color information in the second area 620 of the display of FIG. 6.

Figure 8A:
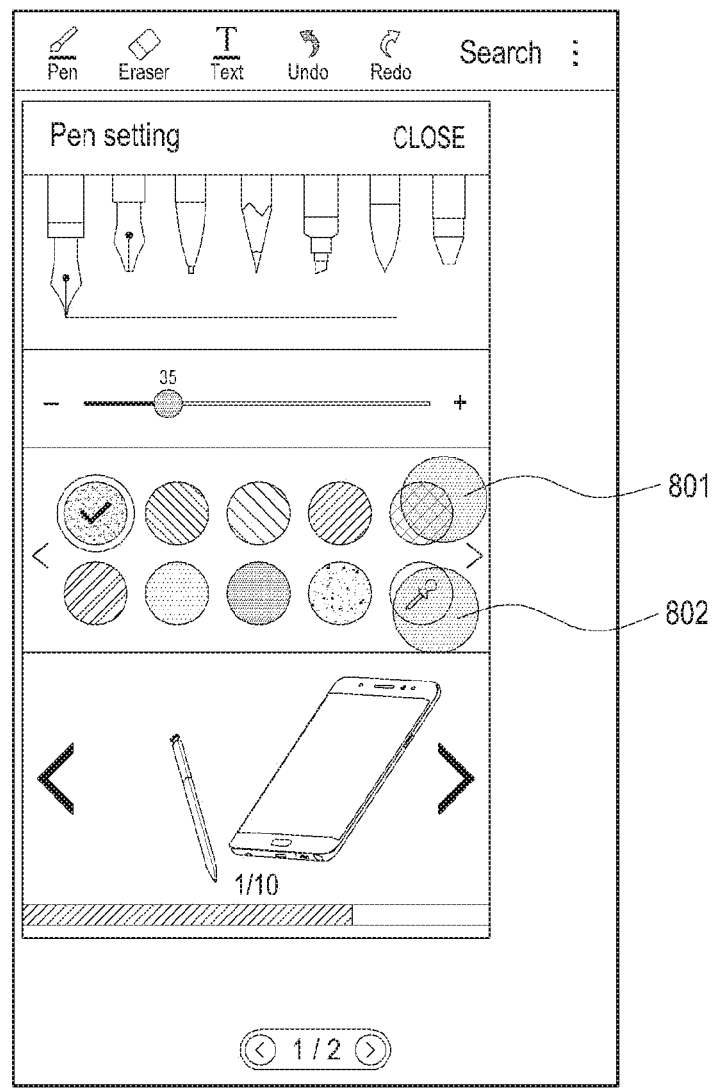
FIGS. 8A and 8B illustrate that an electronic device provides a tool for drawing an object according to various embodiments of the disclosure.
Figure 8B:
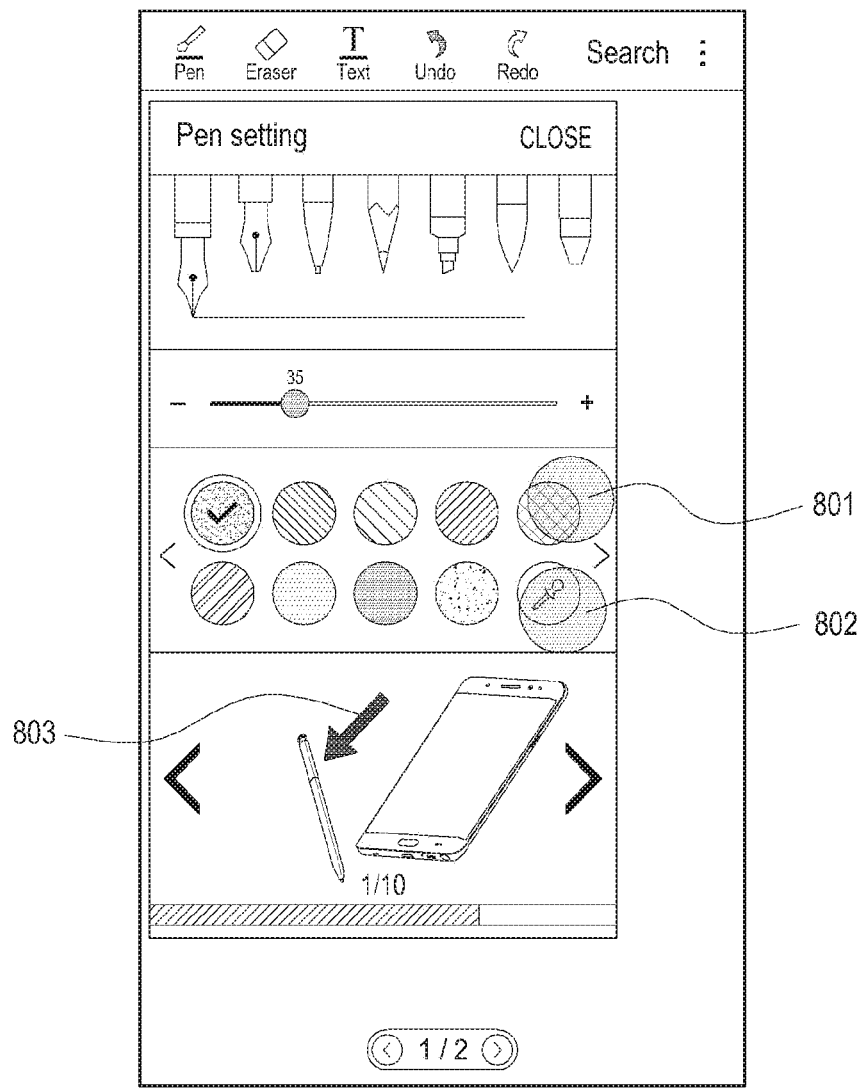

FIGS. 8A and 8B illustrate an embodiment in which an electronic device provides a tool for drawing an object according to various embodiments of the disclosure.

According to various embodiments, a processor (for example, the processor 120 of FIG. 1) may receive an input for extracting or obtaining a particular color or pattern from an image associated with an object that a user intends to draw. Referring to FIG. 8A, a first button 801 and a second button 802 may be provided in a second area of a display for providing color information. Referring to FIG. 8B, the processor (for example, the processor 120 of FIG. 1) may receive an input of selecting the first button 801 via an input device or the like and may receive an input about a portion 803 of the object (as pointed to by the accompanying arrow shown in FIG. 8B). When the input about the portion 803 of the object is received, the processor (for example, the processor 120 of FIG. 1) may obtain a color corresponding to the portion 803 of the image associated with the object and may store the obtained color in the second area 620 (e.g., as shown in FIG. 6) of the display. The user may perform an input about the object using the stored color. According to one embodiment, when the processor (for example, the processor 120 of FIG. 1) receives an input of selecting the second button 802 via an input device or the like and receives an input about the portion 803 of the image associated with the object, the processor (for example, the processor 120 of FIG. 1) may obtain the portion 803 of the image associated with the object from the object and may store the obtained portion 803 of the image associated with the object in a clipboard or a buffer. While FIG. 8A illustrates an input tool that is the portion 803 of the image, the processor (for example, the processor 120 of FIG. 1) may also obtain a color included in the image associated with the object that is a solid color, for example, a tiger's stripe pattern, and may store the color in the second area of the display. The user may not only draw the object but also may input a particular pattern or a particular portion of the object using a solid-color input tool, thereby performing an input about an object.

Figure 9A:
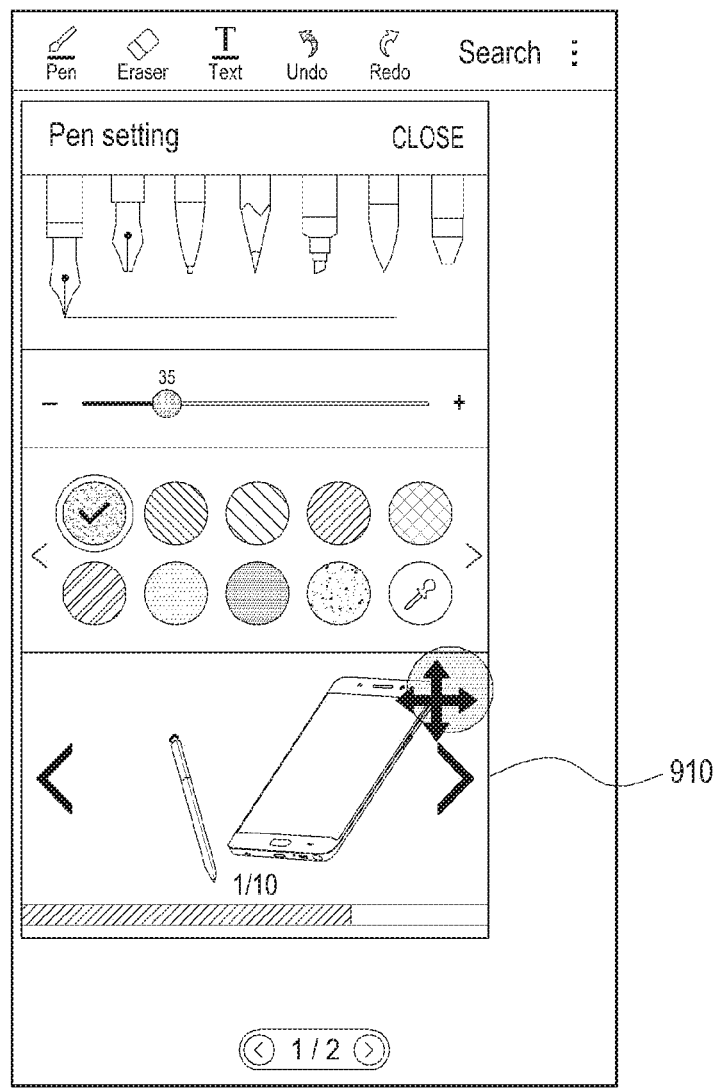
FIGS. 9A and 9B illustrate that an electronic device provides a tool for drawing an object according to various embodiments of the disclosure.
Figure 9B:
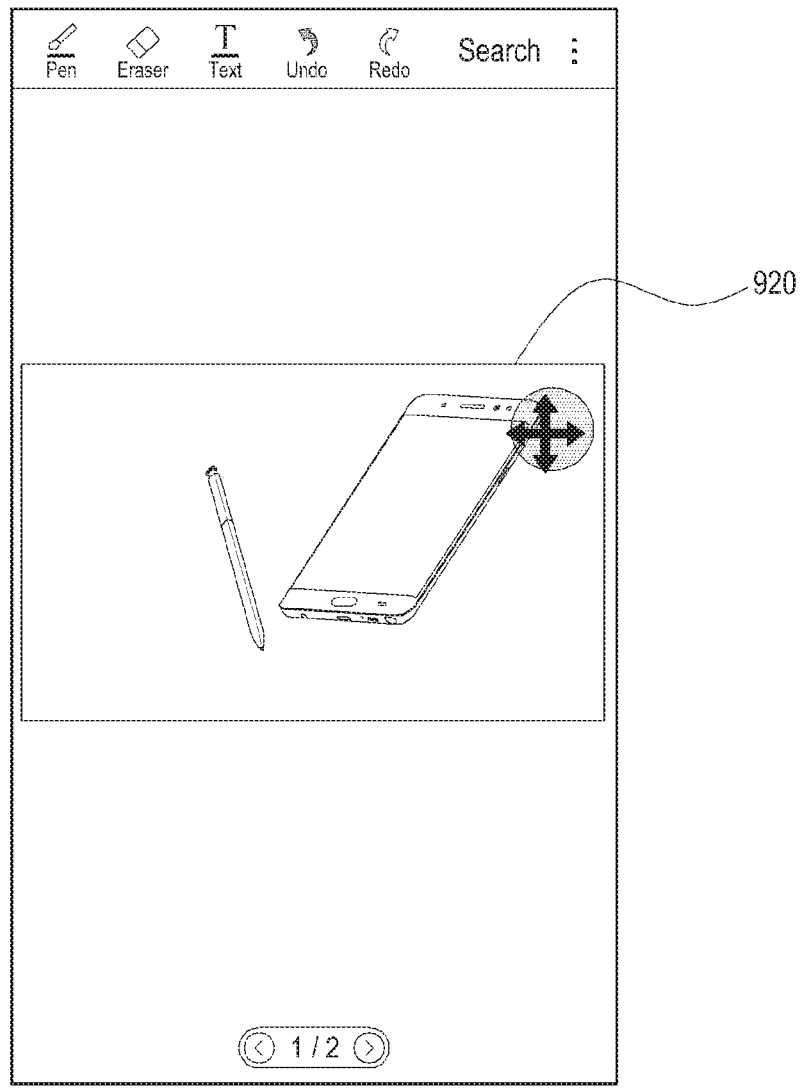

FIGS. 9A and 9B illustrate that an electronic device provides a tool for drawing an object according to various embodiments of the disclosure.

According to various embodiments, a processor (for example, the processor 120 of FIG. 1) may display a silhouette of an image corresponding to an on a display. Referring to FIG. 9A, when the processor (for example, the processor 120 of FIG. 1) receives an input of selecting a button 910 for providing a silhouette of an object displayed in an object tab, the processor (for example, the processor 120 of FIG. 1) may provide a silhouette 920 of an object in an area in which a user draws (creates) an object. The user may not only be provided with a color from the second area 620 of the display but may also draw or create an object according to the silhouette shape of an object displayed on the display.

Figure 10:
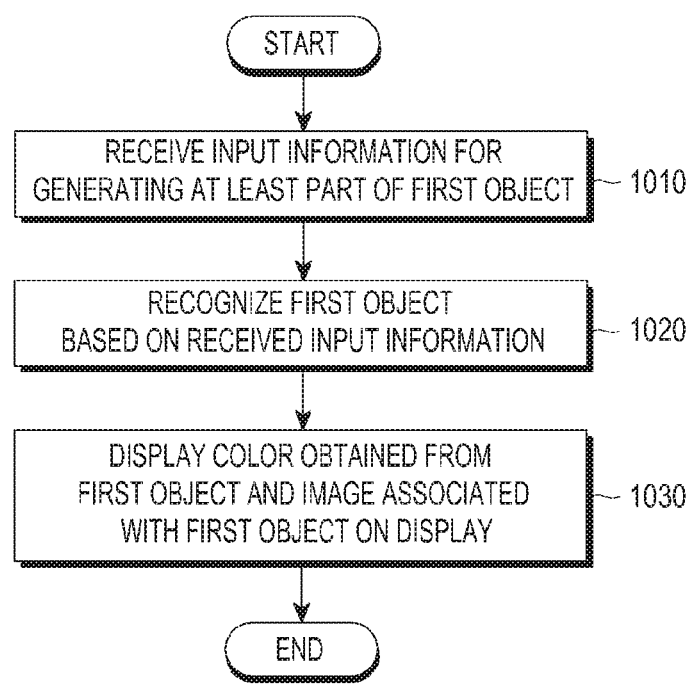
FIG. 10 is a flow chart illustrating a method for controlling an electronic device according to an embodiment of the disclosure.

FIG. 10 is a flow chart illustrating a method for controlling an electronic device according to an embodiment of the disclosure.

According to the method of controlling the electronic device according to various embodiments, a processor (for example, the processor 120 of FIG. 1) may receive input information for generating at least part of a first object in operation 1010. In operation 1020, the processor (for example, the processor 120 of FIG. 1) may recognize the first object based on the received input information. In operation 1030, the processor (for example, the processor 120 of FIG. 1) may control a display to display an image associated with the first object and a color obtained from the image. According to one embodiment, the method may include an operation in which the processor (for example, the processor 120 of FIG. 1) compares the image associated with the recognized first object with a plurality of images associated with a plurality of objects stored in the memory, selects at least one image associated with at least one object from among the plurality of images associated with the plurality of objects based on a comparison result, and controls the display to display the selected image. According to one embodiment, the method may include an operation in which the processor (for example, the processor 120 of FIG. 1) displays the level of similarity between the image associated with the first object and the image associated with the at least one object on a display based on the comparison result. According to one embodiment, the method may include an operation in which the processor (for example, the processor 120 of FIG. 1) receives search information on the first object from a memory or an external server that stores the search information on the first object and an operation in which the processor recognizes the first object using at least one of the received search information and the input information. According to one embodiment, the method may include an operation in which when the processor (for example, the processor 120 of FIG. 1) receives an input of obtaining color information on at least part of the image associated with the first object, the processor obtains the color information on the at least part of the image associated with the first object and stores the color information in the memory. According to one embodiment, the method may include an operation in which when the processor (for example, the processor 120 of FIG. 1) receives an input of copying at least part of the image associated with the first object, the processor copies and stores the at least part of the image associated with the first object in the memory. According to one embodiment, the method may include an operation in which the processor (for example, the processor 120 of FIG. 1) displays a silhouette of the image associated with the first object on the display. According to one embodiment, the method may include an operation in which the processor (for example, the processor 120 of FIG. 1) obtains a plurality of colors from the image associated with the first object, and an operation in which the processor selects at least one color based on the frequency of the plurality of colors in the image and displays the at least one color on the display. According to one embodiment, the method may include an operation in which the processor displays the image associated with the first object in a first area of the display and an operation in which the processor displays the color obtained from the image in a second area of the display.

Details of the method for controlling the electronic device are the same as those described above regarding the electronic device, and thus a description thereof will be omitted herein.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., compact disc-ROM (CD-ROM), DVD), a magneto-optical media (e.g., a floptical disk), an inner memory, etc. The instruction may include a code which is made by a compiler or a code which can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display; and
at least one processor,
wherein the at least one processor is configured to:
  receive input information for generating at least part of a first object in a first area of the display,
  recognize the first object based on the received input information,
  identify an image associated with the first object,
  divide the image associated with the object into a plurality of cells,
  obtain a plurality of color values with respect to each of the plurality of cells,
  obtain a plurality of colors, each of which most frequently included in a corresponding cell of the plurality of cells, based on the plurality of color values,
  identify a frequency for each of the plurality of colors,
  store information on at least one color, among the plurality of colors, that has an identified frequency greater than or equal to a threshold frequency,
  control the display to display the at least one color, wherein the at least one first color is displayed in a second area, different from the first area, of the display,
  receive a user input for displaying a silhouette of the image while the at least one color is displayed, and
  control the display to display, in the first area of the display, the silhouette of the image for guiding a drawing to be inputted.

2. The electronic device of claim 1, further comprising:
a memory,
wherein the at least one processor is further configured to:
  compare the image associated with the recognized first object with a plurality of images associated with a plurality of objects stored in the memory,
  select at least one image associated with at least one object from among the plurality of images associated with the plurality of objects based on a comparison result, and
  control the display to display the at least one image.

3. The electronic device of claim 2, wherein the at least one processor is further configured to control the display to display a level of similarity between the image associated with the first object and the plurality of images associated with the plurality of objects on a display based on the comparison result.

4. The electronic device of claim 1, wherein the at least one processor is further configured to:
receive search information on the first object from a memory or an external server that stores the search information on the first object, and
recognize the first object using at least one of the received search information or the input information.

5. The electronic device of claim 1, wherein the at least one processor is further configured to:
receive an input of copying at least part of the image associated with the first object, and
copy and store the at least part of the image associated with the first object in a memory.

6. The electronic device of claim 1, wherein the at least one processor is further configured to control the display to:

display the image associated with the first object in a first area of the display.

7. A method for controlling an electronic device, the method comprising:
receiving input information for generating at least part of a first object in a first area of a display;
recognizing the first object based on the received input information;
identifying an image associated with the first object;
dividing the image associated with the object into a plurality of cells;
obtaining a plurality of color values with respect to each of the plurality of cells;
obtaining a plurality of colors, each of which most frequently included in a corresponding cell of the plurality of cells, based on the plurality of color values;
identifying a frequency for each of the plurality of colors;
storing information on at least one color, among the plurality of colors, that has an identified frequency greater than or equal to a threshold frequency;
controlling the display to display the at least one color, wherein the at least one color is displayed in a second area, different from the first area, of the display;
receiving a user input for displaying a silhouette of the image while the at least one color is displayed; and
controlling the display to display, in the first area of the display, the silhouette of the image for guiding a drawing to be inputted.

8. The method of claim 7, further comprising:
displaying the image associated with the first object in a first area of the display.

9. The method of claim 7, further comprising:
comparing the image associated with the first object with a plurality of images associated with a plurality of objects stored in a memory;
selecting at least one image associated with at least one object from among the plurality of images associated with the plurality of objects based on a comparison result; and
controlling the display to display the selected image.

10. The method of claim 9, further comprising:
displaying a level of similarity between the image associated with the first object and the at least one image associated with the at least one object on a display based on the comparison result.

11. The method of claim 7, further comprising:
receiving search information on the first object from a memory or an external server that stores the search information on the first object; and
recognizing the first object using at least one of the received search information or the input information.

12. The method of claim 7, further comprising:
copying and storing at least part of the image associated with the first object in a memory when an input of copying the at least part of the image associated with the first object is received.

13. A non-transitory computer-readable recording medium having an executable program stored thereon that, when executed, causes at least one processor to perform:
receiving input information for generating at least part of a first object in a first area of a display;
recognizing the first object based on the received input information;
identifying an image associated with the first object;
dividing the image associated with the object into a plurality of cells;
obtaining a plurality of color values with respect to each of the plurality of cells;
obtaining a plurality of colors, each of which most frequently included in a corresponding cell of the plurality of cells, based on the plurality of color values;
identifying a frequency for each of the plurality of colors;
storing information on at least one color, among the plurality of colors, that has an identified frequency greater than or equal to a threshold frequency;
controlling the display to display the at least one color, wherein the at least one color is displayed in a second area, different from the first area, of the display;
receiving a user input for displaying a silhouette of the image while the at least one color is displayed; and
controlling the display to display, in the first area of the display, the silhouette of the image for guiding a drawing to be inputted.

14. The non-transitory computer-readable recording medium of claim 13, wherein the at least one processor further performs:
comparing the image associated with the recognized first object with a plurality of images associated with a plurality of objects stored in a memory;
selecting at least one image associated with at least one object from among the plurality of images associated with the plurality of objects based on a comparison result; and
controlling the display to display the at least one image.

* * * * *